May 4, 1965 W. H. SINK 3,181,668
DOUBLE CLUTCH AND CONTROL LINKAGE THEREFOR
Filed Jan. 21, 1963 2 Sheets-Sheet 1

May 4, 1965 W. H. SINK 3,181,668
DOUBLE CLUTCH AND CONTROL LINKAGE THEREFOR
Filed Jan. 21, 1963 2 Sheets-Sheet 2

United States Patent Office 3,181,668
Patented May 4, 1965

---

3,181,668
DOUBLE CLUTCH AND CONTROL LINKAGE THEREFOR
William H. Sink, Toledo, Ohio, assignor to Dana Corporation, Toledo, Ohio, a corporation of Virginia
Filed Jan. 21, 1963, Ser. No. 252,769
11 Claims. (Cl. 192—48)

This invention relates to linkages in general and more specifically to a simplified linkage for operating a double clutch.

Double clutches are old in the art and generally comprise a pair of driven members adapted to be pressed into and released from engagement with a driving member either simultaneously or alternatively. The linkage of this invention is contemplated preferably for use with a double clutch of the alternate engagement type and is adapted to be operated by a pair of manual actuating means.

This alternate engaging type of double clutch has been widely used throughout the industry and provides a relatively simple manner of engaging either of two alternately driven members to a common driving member. The driven members are often used in conjunction with a dual range transmission and, therefore be utilized to engage either of the ranges. Since the dual range transmission may have a standard shifting transmission combined serially therewith, it is desirable that the double clutch have a neutral or disengaged position so that the same may function as a normal clutch for the standard transmission.

A most satisfactory alternate engaging type of clutch includes opposed spaced driven members adapted to be alternately passed axially outwardly into engagement with a driving means. Pressure plate means, drivingly connected to the driving means, is disposed between the driven means and adapted to be alternately biased in opposite axial directions into engagement with the driven members. Preferably, a single throw-out mechanism operative to actuate the pressure plate means is adapted to operate over center and has a pair of neutral or disengaged positions, one being on either side of the central position. In this manner, when the throw-out mechanism is moved to its first disengaged position on one side of the central position, it returns the pressure plate means to a first disengaged position on the first side of its central position; release of the throw-out mechanism from its first disengaged position allows the pressure plate means to be biased into engagement with the first driven member on the first side of the central position. Further, when the throw-out mechanism is moved to its second disengaged position on the other side of the central position the pressure plate means is moved to a second disengaged position, release of the throw-out mechanism from its second disengaged position allows the pressure plate means to be biased into engagement with the second driven member.

One commonly used control means for such a double clutch includes a manually operable lever having four aligned positions. However, this lever must be moved in opposed directions from a central position and, accordingly, is not adapted for foot pedal operation, but must be operated by hand. Since the operator normally has a multitude of hand operations, such as steering the vehicle, shifting the transmission, and hand operation of the throttle, the additional actuation of the clutch by hand is undesirable.

Another prior art device discloses a pair of clutch pedals for operating the throw-out mechanism, one pedal being operative for each of the driven members. This device is also objectionable, for, when one pedal is depressed to actuate one clutch, the other pedal becomes elevated. In yet another prior art arrangement three pedals are adapted to operate a pair of linkages resulting in a complicated operating procedure and an excessive number of parts.

It is, therefore, an object of this invention to provide a simplified linkage means for a double clutch.

It is another object of this invention to provide such a linkage means which is operated by means of a pair of manually operated means which may be moved independently of each other.

A further object of this invention is to provide a linkage means for operating the throw-out mechanism of a spring loaded double clutch, which mechanism has separate engaged and disengaged positions for each clutch of the double clutch disposed respectively on opposite sides of a central position and which linkage means is adapted to be operated by a pair of independently moveable manual means.

Yet a still further object of this invention is to provide a linkage means for a double clutch of the type having a pair of driven means adapted to be alternately engaged by resiliently biased pressure plate means and a single throw-out means operatively connected to the pressure plate means for operating the same, and wherein said throw-out means has a pair of neutral or disengaged positions on either side of a central position, which linkage means includes a pair of manually operable means, one being operative to position the throw-out means in one of its disengaged positions and the other being operative to position the throw-out means in its other disengaged position.

Still another object of this invention is to provide such a linkage means operable by a pair of independently movable foot pedals.

Other and further objects of this invention will become apparent upon a consideration of the specification when taken in conjunction with the following drawings wherein.

Figure 1:
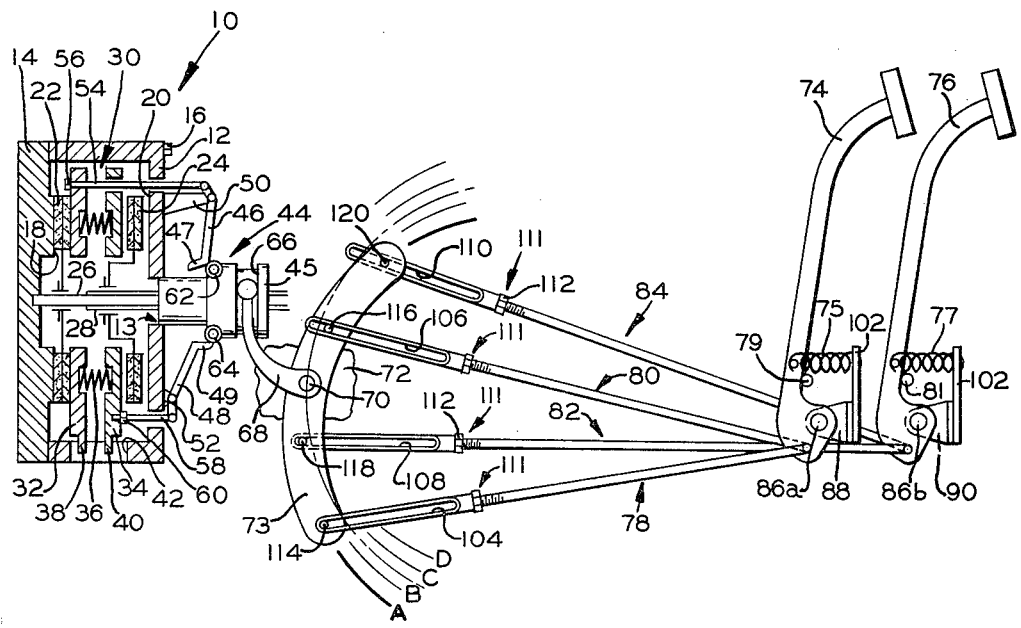
FIG. 1 is a diagrammatic elevational view partially in section illustrating a double clutch and a linkage according to this invention for operating the clutch. The clutch and the linkage are shown in the forward engaged position.

Referring now to the drawings, a double clutch shown generally at 10 includes a cover 12 suitably secured to a driving member in the form of a flywheel 14 by a plurality of bolts, one of which is shown at 16. The inner face 18 of the flywheel 14 and the inner face 20 of the cover 12 are adapted to be frictionally engaged by driven members 22 and 24 respectively. The driven members 22 and 24 are disposed in axially spaced relationship and mounted for rotation relative to the cover 12 while being mounted for unitary rotation and relative axial movement on a pair of axially extending telescoped driven shafts 26 and 28 respectively. The shaft 28 is of a hollow configuration and is rotatably mounted on the shaft 26 which extends therethrough and is piloted at its forward end in the flywheel 14. The shafts 26 and 28 are adapted to alternately provide torque to torque receiving means (not shown) such as a dual range transmission.

A pressure plate means shown generally at 30 is disposed between the driven members 22 and 24 and adapted to be moved outwardly to press the driven members into frictional engagement with the inner faces 18 and 20 respectively of the flywheel and cover. More particularly, the pressure plate means 30 includes a pair of independently axially movable annular pressure members 32 and 34 having compressed therebetween a plurality of circumferentially spaced coiled compression springs 36.

The pressure members 32 and 34 are radially spaced from the driven shafts 26 and 28 and are axially movable relative to and drivingly connected to the cover 12 and flywheel 14 by means of a plurality of lugs 38 and 40 respectively extending radially from the periphery thereof into registering axially extending slots 42 formed in the cover 12.

A release or throw-out mechanism shown generally at 44 includes a throw-out collar 45, movably mounted on the drive shaft 28 and splined for relative axial movement and unitary rotation in the cover 12 as shown at 13, and separate release levers 46 and 48 for the pressure, members 32 and 34 respectively. The levers 46 and 48 have substantially an obtuse L shaped configuration and extend radially outward from the throw-out collar 45 and are pivotally secured at a position radially inwardly from their outer ends to brackets 50 and 52 respectively, which brackets are carried by the back face of the cover 12.

A pull rod 54 is pivotally secured to the outer end of the lever 46 and extends axially forward therefrom through aligned openings in the pressure members 32 and 34 disposed radially outward from the periphery of the driven members 22 and 24. The forward end of the rod 54 has a nut 56 threaded thereon, which nut abuttingly engages the forward face of the pressure member 32, whereby the rod is adapted to pull the pressure member 32 rearwardly against the bias of the springs 36. A push rod 58 is pivotally secured to the outer end of the lever 48 and extends radially forward therefrom, at a position radially outward from the periphery of the driven member 24, into a depression in the back face of the pressure member 34. A nut 60 is threadedly carried by the rod 58 and abuttingly engages the back face of the pressure member 34 whereby the rod 58 is adapted to push the pressure member 34 forwardly against the bias of the springs 36.

Figure 2:
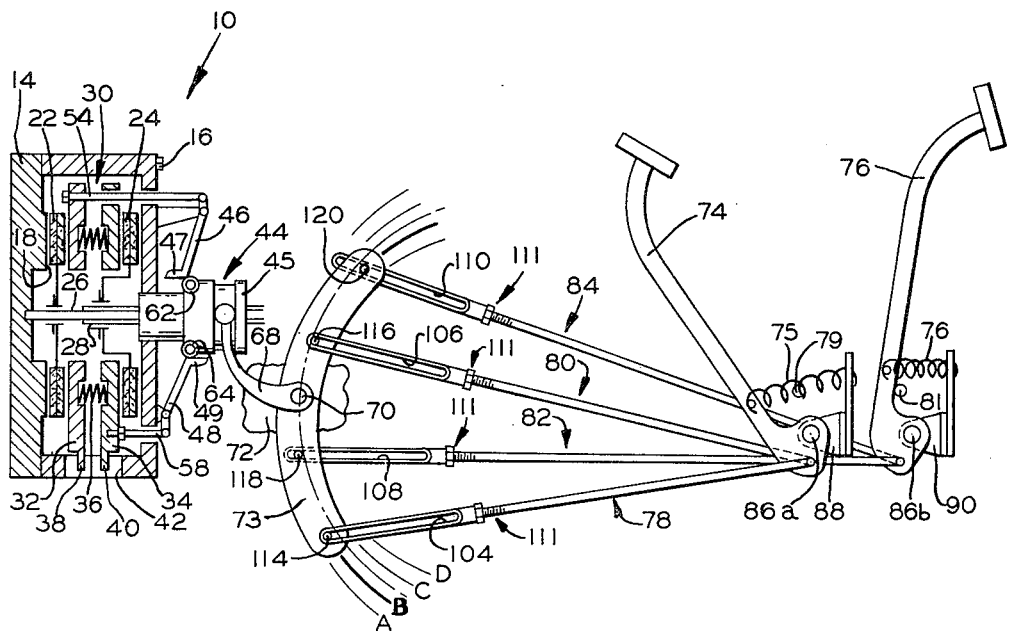
FIG. 2 is a view according to FIG. 1 with the clutch and linkage in the forward disengaged position.
Figure 3:
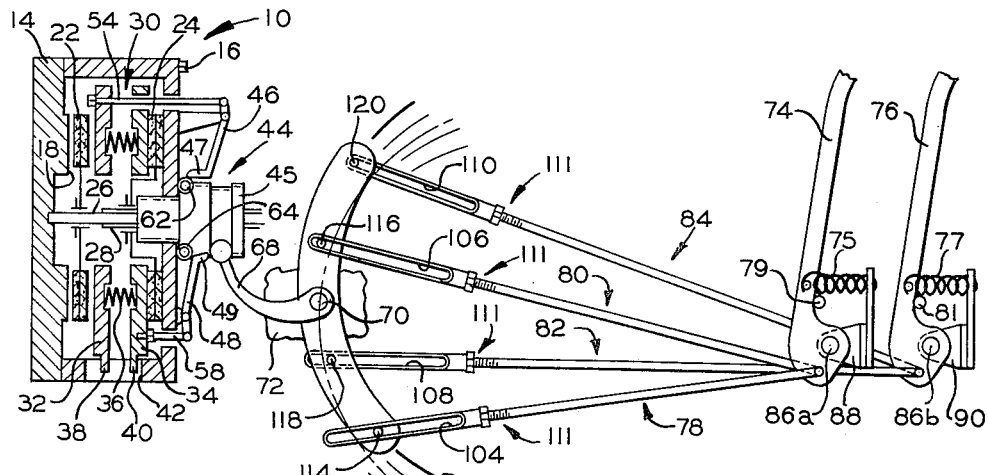
FIG. 3 is a view according to FIG. 1 with the clutch and linkage in the rear engaged position.
Figure 4:
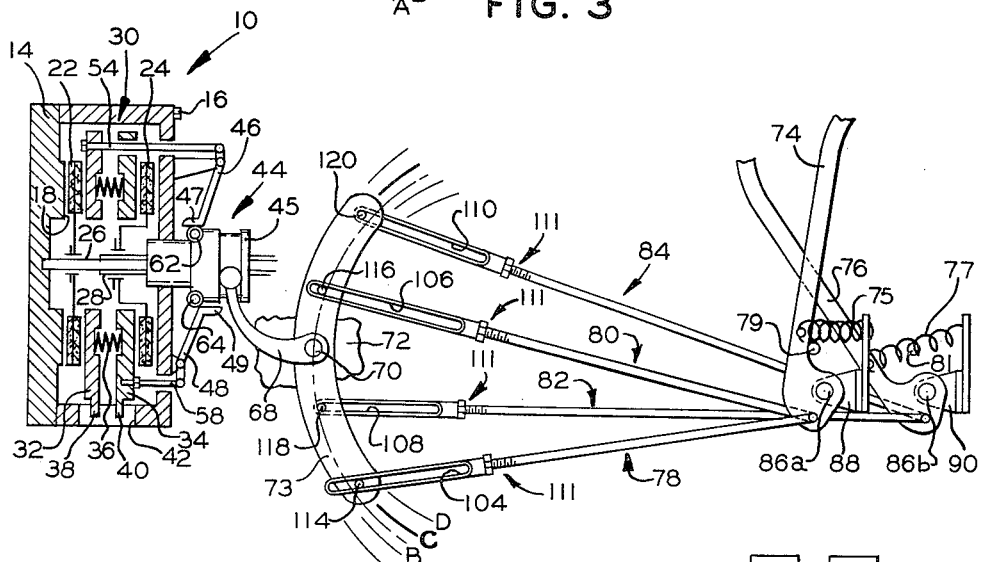
FIG. 4 is a view according to FIG. 1 with the clutch and linkage in the rear disengaged position.

The axially elongated forwardly extending base portion 47 of the lever 46 is adapted as a cam follower and to be rollingly engaged by a cam roller 62 carried by the throw-out collar 45. As shown in FIGS. 2, 3 and 4, when the throw-out collar 45 is in a position displaced forwardly from its rearward position, the roller 62 engages the base 47 of the lever 46 and maintains the same pivoted clockwise whereby the pressure member 32 is held rearwardly against the bias of the springs 36. In this position, the pressure member 32 acts as a stationary reaction member for the springs 36. As shown in FIG. 1, when the throw-out collar 45 moves to its most rearward position, the roller 62 moves rearwardly off of the base portion 47 and allows the lever 46 to pivot counterclockwise thereby extending the rod 54 forwardly and allowing the pressure member 32 to be biased forwardly against the driven member 22 by the springs 36. As the throw-out collar 45 moves forwardly, the cam roller 62 carries the lever 46 clockwise until the lever pivots sufficiently so that the roller 62 engages the base 47 of the lever. Further forward movement of the throw-out collar 45 merely rolls the cam roller 62 along the base 47 without inducing pivotal movement of the lever 46 or axial movement of the pressure member 32 so that the base 47 functions as a lost motion device.

The axially elongated rearwardly extending base portion 49 of the lever 48 is also adapted as a cam follower and to be rollingly engaged by a cam roller 64 carried by the throw-out collar 45. As shown in FIGS. 1, 2 and 4, when the throw-out collar 45 is in a position displaced rearwardly from its forward position, the roller 62 engages the base 49 of the lever 48 and maintains the same pivoted clockwise whereby the pressure member 34 is held forwardly against the biasing of the springs 36 and may function as a reaction member for the springs 36. As shown in FIG. 3, when the throw-out collar 45 moves to its most forward position, the roller 64 moves forwardly off the base portion 49 and allows the lever 48 to pivot counterclockwise thereby moving the rod 58 rearwardly and allowing the pressure member 34 to be biased rearwardly against the driven member 24 by the springs 36. As the throw-out collar 45 moves rearwardly from its forward position, the cam roller 64 carries the lever 48 clockwise until the lever pivots sufficiently so that the cam roller 64 engages the base 49 of the lever. Further rearward movement of the throw-out collar 45 merely rolls the cam roller 64 along the base 49 without inducing pivotal movement of the lever 48 or axial movement of the pressure member 34 so that the base 49 functions as a lost motion device.

Means is provided for moving the throw-out collar 45 fore and aft to alternately engage and disengage the driven members 22 and 24. The collar 45 is provided with an annular groove 66 which receives the spherical end of a bell crank mechanism 68. The other end of the bell chank 68 is securedly mounted to a pin 70 rotatably carried by the vehicle frame shown fragmentarily at 72. An arcuately shaped lever 73 is secured at its mid-point to the pin 70 and adapted to impart oscillatory movement thereto and to the crank 68. Clockwise rotation of the lever 73 and crank 68 results in rearward movement of the colar 45 while counterclockwise movement of the lever and crank results in forward movement of the collar.

Figure 5:
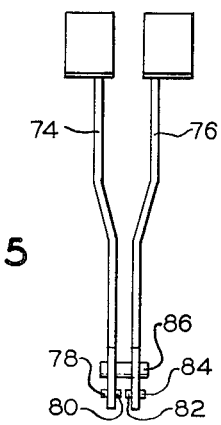
FIG. 5 is an end view of the clutch pedal arrangement.

A pair of manually operable means in the form of foot pedals 74 and 76 and linkage rods 78, 80, 82 and 84 are provided to reciprocally rotate or oscillate the arcuate lever 73. In the preferred embodiment as shown in FIG. 5, the pedals 74 and 76 are disposed in spaced side-by-side relationship; each being pivotally mounted adjacent its lower end on a common pivot pin 86, which pin is carried by a portion of the vehicle frame. In FIGS. 1–4, the pedals 74 and 76 are shown displaced axially for clarity purposes with the pedal 74 pivotally mounted in a bracket 88 by means of a pivot pin 86a and the pedal 76 mounted in a bracket 90 by means of a pivot pin 86b. The brackets 88 and 90 are suitably secured to a portion of the vehicle frame shown fragmentarily at 102. The pedals 74 and 76 are normally biased counterclockwise to an upright position by means of return springs 75 and 77 secured respectively thereto and to the frame 102. The springs 75 and 77 are provided mainly to keep the pedals 74 and 76 upright so that they will not be loose as a result of loose fits and wear of the various elements connected thereto. A pair of stop pins 79 and 81 abut the rear side of the levers 74 and 76 respectively and are operative to position the same substantially vertically.

The foot pedal 74 has pivotally connected to the lower end thereof the linkage rods 78 and 80, while the pedal 76 has pivotally connected to its lower end the linkage rods 82 and 84, which rods are of two piece construction adjustably threaded together, as shown generally at 111, so that the length of the rods may be adjusted. A locknut 112 is carried by each rod to secure the length adjustment thereof.

The forward ends of the rods 78, 80, 82 and 84 are provided with elongated slots 104, 106, 108 and 110 respectively, which slots respectively receive pins 114, 116, 118 and 120 carried by the lever 73; the pin 114 being secured to the lever adjacent its lower end, the pin 118 being secured intermediate the pin 114 and the pivot pin 70, the pin 120 being secured adjacent the upper end of the lever, and the pin 116 being secured intermediate the pin 120 and the pivot pin 70. The right ends of the slots 104, 106, 108 and 110 are extended sufficiently so that they do not engage the pin contained therein regardless of the relative movement of the lever 73 and linkage rods 78, 80, 82 and 84 and may function as lost motion means.

As shown in FIG. 1, wherein the clutch means is in its forward engaged position with the pressure member 32 in engagement with the driven member 22 and the pressure member 34 disengaged from the driven member 24, the collar 45 is at its most rearward position and the arcuate lever 73 is disposed in its most clockwise position indicated at A, the pin 114 abuts the left end of the slot 104, pin 118 is slightly spaced from the left end of the slot 108, the pin 116 is further spaced from the left end of slot 106, and pin 120 is still further spaced from the left end of slot 110. To move the clutch means to its forward disengaged position wherein both the pressure members 32 and 34 are spaced from the driven members 22 and 24, the clutch pedal 74 is depresed to the position shown in FIG. 2, which depression moves the rods 78 and 80 to the right while the rods 82 and 84, secured to pedal 76, remain stationary. The pin 114, which is in engagement with the left end of slot 104, is urged to the right and carries the lever 73 and the crank 68 counterclockwise thereby urging the collar 45 forwardly. This counterclockwise rotation of the lever 73 is not interfered with by the rods 82 and 84, for, the pin 120 in moving counterclockwise merely moves closer to the left end of the stationary rod 84 while the pin 118 moves farther away from the left end of the slot 108. Accordingly, the pins 120 and 118 and the slots 110 and 108 at this time function as lost motion means. Since the lever 73 is moving counterclockwise, the pin 116 is carried to the left while the rod 80 is moving to the right. Accordingly, counterclockwise movement of the lever 73 will continue until the pin 116 engages the left end of the slot 106. This position of the lever 73 is shown at B in FIG. 2.

The position required for the collar 45 to cause the disengagement of the pressure member 32 as shown in FIG. 2, is at a point where the cam roller 62 has pushed the clutch lever 46 clockwise sufficiently so that the rod 54 has pulled the pressure member 32, against the biasing effect of the springs 36, from the driven member 22. Accordingly, the lever 73 in moving from its position shown at A to its position shown at B is moving the pressure plate 32 rearwardly and compressing or biasing the springs 36, so that the position B of the lever 73 is a spring biasing position. Care should be exercised so that the cam roller 62 does not engage the base portion 47 of the lever at this time, so that upon release of the pedal 74 the springs 36 are operative to bias the pressure member 32 into engagement with the driven member 22. In biasing the member 32, the springs 36 also biases the lever 46 counterclockwise which in turn biases the cam roller 62 and collar 45 to the right and the crank 68 and lever 73 counterclockwise. Since the lever 73 has been biased to its position shown at A from its spring biasing position shown at B, the position A of the lever 73 is a spring biased position. Therefore, the length of the rods 78 and 80 must be adjusted at 111 so that the pin 116 abuts the left end of slot 106 to stop the counterclockwise rotation of the lever 73 when it is in the desired spring biasing or disengaged position shown in FIG. 2.

During the above described movement of the collar 45, from the engaged to the disengaged position of the pressure member 32, the cam roller 64 remains engaged with the elongated base portion 49 of the clutch lever 48 thereby maintaining the pressure member 34 in its disengaged position where the same functions as a reaction means for the springs 36. Accordingly, the base portion 49 and roller 64 function as a locking and lost motion means.

To disengage the pressure member 32 from the driven member 22, and engage the pressure member 34 with the driven member 24, a condition shown in FIG. 3, the following operation is performed. The foot pedal 76 is depressed to the position shown in FIG. 4, which depression moves the rods 82 and 84 to the right while the rods 78 and 80 remain stationary. As the rod 82 moves to the right, the pin 118, which was only slightly spaced from the left end of the slot 108 in the rod 82 as shown in FIG. 1, is engaged by the left end of the slot 108 and carried to the right by the rod 82 thereby carrying the lever 73 and the crank 68 counterclockwise which urges the collar 45 forwardly. This counterclockwise rotation is not interfered with by the stationary rods 78 and 80 since the pin 114, in moving counterclockwise, moves farther away from the left of the slot 104 and the pins 116 merely move closer to the left end of the slot 106 in rod 80 but does not engage the same. Accordingly, at this time the pins 114 and 116 and slots 104 and 106 function as lost motion means.

Since the lever 73 is moving counterclockwise, the pin 120, which had been substantially displaced from the left end of the slot 110, is carried toward the left while the rod 84 is moving toward the right. Accordingly, rotational movement of lever 73 will continue until the pin 120 engages the left end of slot 110 and the lever is in the position indicated at C. In this position the lever 73 and crank 68 have moved the throw-out collar 45 forwardly so that the cam roller 62 has moved the lever 46 to the left, disengaging the pressure member 32, and is now engaging the elongated base portion 47 of the lever 46 thereby maintaining the pressure member 32 in a disengaged position whereby the same may function as a reaction means for the springs 36. Simultaneously, the cam roller 64 has been moved to the left to a position just forwardly of the elongated base portion of a lever 48, whereby the cam roller 64 is operative to maintain the lever 48 in its clockwise position, with the pressure member 34 disengaged, against the biasing effect of the springs 36. This position C of the lever 73 and the corresponding position of the collar 45 positions the clutch means in its rearward disengaged position wherein both the pressure members 32 and 34 are spaced from the driven members 22 and 24 with the pressure member 34 operative to be biased into engagement. Since the lever 73 at this time is maintaining the pressure plate 34 in a position wherein the latter is compressing or biasing the springs 36, the position C of the lever 73 is a spring biasing position. The length of the rods 82 and 84 must be adjusted at 111 so that the pins 118 and 120 engage the left ends of slots 108 and 110 respectively when the lever 73 is in the desired spring biasing or disengaged position C.

At this time, release of the foot pedal 76, to the position shown in FIG. 3, moves the rods 82 and 84 to the left so that the lever 73 may pivot further counterclockwise to the position shown in FIG. 3 indicated at D. Since the lever 73 is not being held in its spring biasing position C by the rods 82 and 84, the springs 36 are operative to bias the pressure member 34 against the driven member 24 thereby urging the lever 48 counterclockwise, the cam rollers 64 and the collar 45 forwardly, and the crank 68 and lever 73 counterclockwise to the position shown at D; the position D being the clutch means rearward engaged position, and, since the lever 73 has been biased to its position D from its position C by the biasing effect of the springs 36, the position D of the lever 73 is a spring biased position.

In this state of operation, the pin 120 is in engagement with the left end of the slot 110, the pin 116 is slightly removed from the left end of the slot 106, the pin 118 is farther removed from the left end of the slot 108, and the pin 114 is still farther removed from the left end of slot 104.

With the pressure member 34 in the engaged position, as shown in FIG. 3, if the rear disengaged position of the clutch means is desired, the foot pedal 76 is depressed moving the rods 82 and 84 to the right as shown in FIG. 4. Since the pin 120 is in engagement with the left end of the slot 110, the rod 84 will rotate the lever 73 clockwise until the pin 118 engages the left end of the slot 108. At this time, the lever 73 will be in the spring biasing position indicated at C, and while moving to this position, will move the collar 45 and the cam rollers 62 and 64 carried thereby rearwardly. The cam roller 62 merely moves in a lost motion manner along the elongated base portion 47 of the lever 46 thereby maintaining the pressure member 32 in its disengaged reaction position, while the cam roller 64 carries the lever 48 clockwise and moves the pressure member 34 to its disengaged position thereby compressing and biasing the springs 36. As previously described, with the pins 118 and 120 against the left ends of the slots 108 and 110 respectively, the cam roller 64 does not engage the base portion 49 of the lever 48, so that upon release of the pedal 76, the rods 82 and 84 move to the left, and the bias of the springs 36 moves the pressure member 34 to the right into engagement with the driven member 24, the clutch lever 48 counterclockwise, the collar 45 forwardly, and the crank 68 and lever 73 counterclockwise.

With the pressure member 34 in the engaged position as shown in FIG. 3, if the front disengaged position of the clutch means is desired, the foot pedal 74 is depressed moving the rods 78 and 80 to the right as shown in FIG. 2. The lever 80 carries the pin 116 to the right thereby urging the lever 73 clockwise until the pin 114 engages the left end of the slot 104. This clockwise movement of the lever 73 and crank 68 urges the collar 45 rearwardly until the cam rollers 64 engage the elongated base portion 49 of the lever 48 in a lost motion relationship, thereby maintaining the pressure member 34 in a disengaged reaction position, while the cam roller 62 engages the lever 46 and maintains the pressure member 32 in a disengaged position. At this time, release of the foot pedal 74 moves the rods 78 and 80 to the left and allows the springs 36 to bias the pressure member 32 into engagement with the driven member 22 as previously described.

From the above description, it is apparent that the rods 80 and 82, upon depression of the foot pedals 74 and 76 respectively, causes the lever 73 to move alternately between the spring biasing positions indicated at B and C, which are the disengaged positions of the clutch means. These rods 80 and 82, therefore, function as the means for crossing over from one disengaged position to the other. The rods 78 and 84 function to limit the extent of the crossover so that the proper disengaged position is reached, and further function to return the lever 73 to the spring biasing positions indicated at B and C from the spring biased positions indicated at A and D respectively when clutch disengagement is desired without crossover.

From the foregoing, it is apparent that many changes can be made in both the structure and operation of the foregoing described embodiments without departing from the scope of applicant's invention as defined in the appended claims.

I claim:

1. A mechanism for inducing motion to an element having a central location, first and second spring biased positions on opposed sides of the central location and first and second spring biasing positions on opposed sides of said central location comprising in combination, a first and a second linkage means operatively connected to said element and each including a lost motion device, said first linkage means being movable to a first position to position said element in said first spring biasing position while said element moves relative to said second linkage means as a result of the operation of the lost motion device therein and being movable to a second position whereby said element is free to move to its first spring biased position while moving relative to said second linkage means as a result of the operation of the lost motion device therein, said second linkage means being movable to a first position to position said element in said second spring biasing position while said element moves relative to said first linkage means as a result of the operation of the lost motion device therein and being movable to a second position whereby said element is free to move to its second spring biased position while moving relative to said first linkage means as a result of the operation of the lost motion device therein, whereby said linkages independently position said element.

2. The combination with a double clutch having a first and a second driven member, a pressure plate means, spring means for alternately biasing said pressure plate means into engagement with said first and said second driven member and a single throw-out member operatively connected to said pressure plate means and having a central position and a first and a second displaced position on opposite sides of the central position for maintaining said pressure plate means against the biasing effect of said spring means in a disengaged position relative to said first and second driven members respectively and a first and second engaged position on opposite sides of the central location wherein said spring means is operative to bias said pressure plate means solely into engagement with said first and second and driven members respectively, of a support means, first and second pedal means pivotally secured to said support means and each having a normal position and a depressed position, a first linkage means operatively connecting said first pedal means to said throw-out member and operative to position the same in said first disengaged position upon depression of said first pedal means, a second linkage means operatively connecting said second pedal means to said throw-out member and operatively to position the same in said second disengaged position, said first pedal means and said first linkage means including a lost motion device, and said second pedal means and said second linkage means including a lost motion device, said pedal and linkage means being operable to position said throw-out means independently of each other whereby upon depression of said first pedal means said second pedal means remains stationary and upon depression of said second pedal means said first pedal means remains stationary.

3. The combination with a double clutch having a first and a second driven member, a pressure plate means having a central disengaged position, spring means for alternately biasing said pressure plate means into engagement with said first and said second driven member, throw-out means, and means operatively connecting said throw-out means to said pressure plate means, said throw-out means having a central location, first and second disengaged positions on opposite sides of the central location for maintaining said pressure plate means against the biasing effect of the spring means in a disengaged position relative to both said first and second driven members and first and second engaged positions on opposite sides of the central location wherein said spring means is operative to bias said pressure plate means into engagement with said first and second driven members respectively and wherein said pressure plate means is maintained in a disengaged position relative to said second and first driven members respectively, of a first and a second manually operable means, and linkage means operatively connecting said manually operable means to said throw-out means and including a lost motion means, said first manually operable means and said linkage means being operative to position said throw-out means in said first engaged and first disengaged positions independently of said second manually operable means, and said second manually operable means and said linkage means being operative to position said throw-out means in said second engaged and second disengaged positions independently of said first manually operable means, whereby said manually operable means position said throw-out means independent of each other.

4. The combination with a double clutch having a first and a second driven member, a pressure plate means, spring means for alternately biasing said pressure plate means into engagement with said first and said second driven member, throw-out means, and means operatively connecting said throw-out means to said pressure plate means, said throw-out means having a central location, a first and a second disengaged position on opposite sides of the central location for maintaining said pressure plate means against the biasing effect of the spring means in a disengaged position relative to both said first and second driven members and a first and a second engaged position on opposite sides of the central location wherein the spring means is operative to bias said pressure plate means into engagement with said first and second driven members respectively and wherein said pressure plate means is maintained in a disengaged position relative to said second and first driven members respectively, of a first and a second manually operable means, and a first and a second linkage means operatively connecting said first and second manually operable means respectively to said throw-out means and each including a lost motion means, said first manually operable means and said first linkage means being operative to position said throw-out means in said first engaged and first disengaged positions independent of said second manually operable means through the operation of said lost motion means in said second linkage means, and said second manually operable means and said second linkage means being operative to position said throw-out means in said second engaged and second disengaged positions independent of said second manually operable means through the operation of said lost motion means in said first linkage means, whereby said manually operable means position said throw-out means independent of each other.

5. The combination with a double clutch having a first and a second driven member, a pressure plate means, spring means for alternately biasing said pressure plate means into engagement with said first and said second driven member, throw-out means, and means operatively connecting said throw-out means to said pressure plate means, said throw-out means having a central location, a first and a second disengaged position on opposite sides of the central location for maintaining said pressure plate means against the biasing effect of said spring means in a disengaged position relative to both said first and second driven members and a first and a second engaged position on opposite sides of the central location wherein said spring means is operative to bias said pressure plate means into engagement with said first and second driven members respectively and wherein said pressure plate means is maintained in a disengaged position relative to said second and first driven members respectively, of a first and a second manually operable means each having a normal spring biased position and a manually displaced position with said displaced position of both said manually operable means being in the same direction from said normal position, a first and a second linkage means operatively connecting said first and second manually operable means respectively to said throw-out means and each including a lost motion means, said manually operable means each being operative to be manually displaced to its displaced position in the same direction from said normal position independent of movement of the other, said first manually operable means and said first linkage means being operative to position said throw-out means in said first disengaged position and said pressure plate means in its disengaged position when said first manually operable means is displaced to said displaced position and being operative upon return to said normal position to position said first linkage means whereby said spring means biases said pressure plate means into engagement with said first driven member and said throw-out means to its first engaged position, and said second manually operable means and said second linkage means being operative to position said throw-out means in said second disengaged position and said pressure plate means in its disengaged position upon said second manually operable means being displaced to its displaced position and being operative upon return to said normal position to position said second linkage means whereby said spring means biases said pressure plate means into engagement with said second driven member and said throw-out means to its second engaged position, said manually operable means being operative to position said throw-out means independent of each other through the operation of said lost motion means.

6. The combination with a double clutch having a first and a second driven member, a pressure plate means, spring means for alternately biasing said pressure plate means into engagement with said first and said second driven member, throw-out means, and means operatively connecting said throw-out means to said pressure plate means, said throw-out means having a central position and a first and a second displaced position on opposite sides of the central location for maintaining said pressure plate means against the biasing effect of said spring means in a disengaged position relative to both said first and second driven members respectively and a first and a second engaged position on opposite sides of the central location wherein said spring means is operative to bias said pressure plate means into engagement with said first and second driven members respectively and wherein said pressure plate means is maintained in a disengaged position relative to said second and first members respectively, of a first and a second manually operable means both having a normal spring biased position and a manually displaced position in the same direction from said normal position, a first pair of linkage elements operatively connecting said first manually operable means to said throw-out means and each including a lost motion means, and a second pair of linkage elements operatively connecting said second manually operable means to said throw-out means and each including a lost motion means, one of said first pair of linkage elements being operative upon movement of said first manually operable means to its displaced position to position said throw-out means in its first disengaged position from said second engaged position while said lost motion means of the other of said linkage elements are operating, the other of said first pair of linkage elements being operative upon movement of said first manually operable means to its displaced position to position said throw-out means in its first disengaged position from said first engaged position whereby displacement of said first manually operable means positions said throw-out means in said first disengaged position, one of said second pair of linkage elements being operative upon the movement of said second manually operable means to its displaced position to position said throw-out means in its second disengaged position from said first engaged position while said lost motion means of the other of said linkage elements are operating, the other of said second pair of linkage elements being operative upon movement of said second manually operable means to its displaced position to position said throw-out means in its second disengaged position from said second engaged position whereby displacement of said second manually operable means positions said throw-out means in said second disengaged position and said manually operable means position said throw-out means independent of each other.

7. An article of manufacture comprising in combination, a support, an oscillating element, means mounting said oscillating element on said support for oscillatory movement relative thereto whereby said element is operative to occupy a first and a second position counterclockwise and a first and second position clockwise of a central location, spring means operatively connected to said oscillating element and operative when said oscillating element is clockwise of said central location to bias said oscillating element to move further clockwise from said central location and when said oscillating element is counterclockwise of said central location is operative to bias said oscillating element to move further counterclockwise of said central location, a first and a second manually operable element both having a normal position and a position displaced in the same direction from said normal position, a first pair of linkage rods operatively connecting said first manually operable element and said oscillating element and each including a lost motion device, a second pair of linkage rods operatively connecting said second manually operable element and said oscillating element and each including a lost motion device, one of said first pair of linkage rods being operative upon movement of the first manually operable element to its displaced position to position said oscillating element from its farthest clockwise position to an intermediate counterclockwise position while said lost motion devices of all said other linkage rods are operating whereby said other linkage rods do not interfere with such movement of said oscillating element, the other of said first pair of linkage rods being operative upon movement of said first manually operable element to its displaced position to position said oscillating element in its intermediate counterclockwise position from its farthest counterclockwise position while said lost motion devices of all said other linkage rods are operating whereby said other linkage rods do not interfere with such movement of said oscillating element and displacement of said first manually operable element positions said oscillating element in an intermediate counterclockwise position against the bias of said spring means which is operative to bias said element further counterclockwise, one of said second pair of linkage rods being operative upon movement of said second manually operable element to its displaced position to position said oscillating element from its farthest counterclockwise position to an intermediate clockwise position while said lost motion devices of all said other linkage rods are operating whereby said other linkage rods do not interfere with such movement of said oscillating element, the other of said second pair of linkage rods being operable upon movement of said second manually operable element to its displaced position to position said oscillating element in its intermediate clockwise position from its farthest clockwise position while said lost motion devices of all said other linkage rods are operating whereby said other linkage rods do not interfere with such movement of said oscillating element and displacement of said second manually operable element positions said oscillating element in an intermediate clockwise position and said manually operable elements position said rotatable element independently of each other.

8. The combination defined in claim 7 wherein said lost motion device included in said pairs of linkage rods is disposed in the connection between said linkage rods and one of said elements.

9. The combination defined in claim 7 wherein means mount said manually operable elements on said support for oscillatory movement relative thereto, said manually operable elements oscillate between their normal and displaced positions and movement of said first manually operable element from its displaced position to its normal position positions said first linkage rods whereby said spring means is operable to bias said rotatable element in its farthest counterclockwise position, and wherein return of said second manually operable element to its normal position from its displaced position positions said second linkage rods whereby said spring means is operable to bias said rotatable element to its farthest clockwise position.

10. The combination defined in claim 7 wherein said mounting means mounts said oscillating element at a position intermediate its ends, means connect one of said first pair of linkage rods to said oscillating element on one side of said intermediate position while means connect the other of said first pair of linkage rods to said oscillating element on the other side of said intermediate position, means connect one of said second pair of linkage rods to said oscillating element on one side of said intermediate position while means connect the other of said second pair of linkage rods to said oscillating element on the other side of said intermediate position.

11. The combination according to claim 7 wherein said support includes a vehicle frame, a double clutch and means mounting said double clutch on said frame, said double clutch includes a throw-out means movable to alternate first and second positions on each side of a central position, and means connect said oscillating element and said throw-out means whereby oscillation of said oscillating element induces corresponding axial movement of said throw-out means to its alternate positions.

References Cited by the Examiner

UNITED STATES PATENTS

| | | | |
|---|---|---|---|
| 1,900,119 | 3/33 | Lysholm et al. | 74—474 |
| 2,261,432 | 11/41 | Cooke. | |
| 3,096,663 | 7/63 | Sink | 74—474 |

FOREIGN PATENTS

| | | |
|---|---|---|
| 737,160 | 10/32 | France. |
| 863,473 | 3/61 | Great Britain. |

DAVID J. WILLIAMOWSKY, *Primary Examiner.*

UNITED STATES PATENT OFFICE
CERTIFICATE OF CORRECTION

Patent No. 3,181,668                 May 4, 1965

William H. Sink

It is hereby certified that error appears in the above numbered patent requiring correction and that the said Letters Patent should read as corrected below.

Column 1, line 15, for "alternatively" read -- alternately --; line 24, after "therefore" insert -- , can --; line 32, for "passed" read -- pressed --; column 4, line 17, for "chank" read -- crank --; line 23, for "colar" read -- collar --; column 5, line 8, for "depresed" read -- depressed --; column 8, line 20, for "operatively" read -- operative --.

Signed and sealed this 21st day of September 1965.

(SEAL)
Attest:

ERNEST W. SWIDER                   EDWARD J. BRENNER
Attesting Officer                      Commissioner of Patents